United States Patent
Maresh

(10) Patent No.: US 7,541,316 B2
(45) Date of Patent: Jun. 2, 2009

(54) WELLBORE TREATMENT FLUIDS HAVING IMPROVED THERMAL STABILITY

(75) Inventor: Jody L. Maresh, Huntsville, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/051,538

(22) Filed: Feb. 4, 2005

(65) Prior Publication Data

US 2006/0178274 A1   Aug. 10, 2006

(51) Int. Cl.
C09K 8/20     (2006.01)
C09K 8/24     (2006.01)
E21B 43/00    (2006.01)

(52) U.S. Cl. .................. 507/120; 507/110; 507/112; 507/209; 507/213; 507/214; 507/225; 166/305.1; 175/65

(58) Field of Classification Search .............. None
See application file for complete search history.

(56) References Cited

U.S. PATENT DOCUMENTS

| | | | | |
|---|---|---|---|---|
| 3,463,730 A | * | 8/1969 | Booth et al. | 210/701 |
| 3,615,794 A | * | 10/1971 | Nimerick | 523/130 |
| 3,845,822 A | * | 11/1974 | Clampitt et al. | 166/281 |
| 3,898,165 A | * | 8/1975 | Ely et al. | 507/210 |
| 4,191,249 A | * | 3/1980 | Sarem | 166/305.1 |
| 4,318,835 A | * | 3/1982 | Clarke | 264/36.16 |
| 4,409,110 A | | 10/1983 | Borchardt et al. | 252/8.55 D |
| 4,604,217 A | * | 8/1986 | Lukach et al. | 507/215 |
| 4,664,818 A | * | 5/1987 | Halliday et al. | 507/113 |
| 4,900,457 A | | 2/1990 | Clarke-Sturman | 252/8.514 |
| 5,030,366 A | * | 7/1991 | Wilson et al. | 507/228 |
| 5,111,886 A | * | 5/1992 | Dovan et al. | 166/300 |
| 5,284,513 A | * | 2/1994 | Cowan et al. | 106/790 |
| 5,307,877 A | * | 5/1994 | Cowan et al. | 166/295 |
| 5,483,986 A | | 1/1996 | Onan et al. | 137/1 |

(Continued)

FOREIGN PATENT DOCUMENTS

EP     0 728 826 A1  *   8/1996

(Continued)

OTHER PUBLICATIONS

Patent application entitled "Methods and Compositions For Improving The Thermal Stability of Aqueous Polymeric Wellbore Treatment Fluids" by Jody L. Maresh, filed Feb. 4, 2005 as U.S. Appl. No. 11/051,375.

(Continued)

Primary Examiner—James Seidleck
Assistant Examiner—John J Figueroa
(74) Attorney, Agent, or Firm—Craig W. Roddy; Karen B. Tripp

(57) ABSTRACT

Aqueous wellbore treatment fluids having improved thermal stability are provided. The wellbore treatment fluids comprise at least one polysaccharide and an effective amount of at least one polyacrylamide to maintain its stability at a temperature greater than about 250° F. A formate compound is not required to achieve high-temperature stability in the fluid. Thus, the fluid is less expensive than conventional polymer-containing aqueous wellbore treatment fluids. The aqueous fluid may serve as, for example, a drilling fluid in the wellbore and thus may be circulated through the wellbore without being concerned that it could become unstable due to exposure to relatively high downhole temperatures.

19 Claims, 2 Drawing Sheets

U.S. PATENT DOCUMENTS

| | | | | |
|---|---|---|---|---|
| 5,501,276 | A | 3/1996 | Weaver et al. | 166/291 |
| 5,684,075 | A * | 11/1997 | Patel et al. | 524/386 |
| 5,697,458 | A * | 12/1997 | Carney | 175/65 |
| 5,789,349 | A * | 8/1998 | Patel | 507/121 |
| 5,849,674 | A * | 12/1998 | Fox et al. | 507/140 |
| 5,955,401 | A | 9/1999 | Liao | 507/110 |
| 6,124,244 | A * | 9/2000 | Murphey | 507/111 |
| 6,133,203 | A | 10/2000 | Estes et al. | 507/209 |
| 6,209,646 | B1 | 4/2001 | Reddy et al. | 166/300 |
| 6,420,319 | B1 | 7/2002 | Estes et al. | 507/209 |
| 6,489,270 | B1 | 12/2002 | Vollmer et al. | 507/261 |
| 6,702,044 | B2 | 3/2004 | Reddy et al. | 175/64 |
| 6,767,869 | B2 | 7/2004 | DiLullo et al. | 507/244 |
| 6,770,601 | B1 | 8/2004 | Brookey | 507/105 |
| 6,784,140 | B2 | 8/2004 | Kippie et al. | 507/136 |
| 6,794,340 | B2 | 9/2004 | Nguyen et al. | 507/110 |
| 6,823,940 | B2 | 11/2004 | Reddy et al. | 166/295 |
| 6,837,316 | B2 | 1/2005 | Reddy et al. | 175/64 |
| 2003/0130113 | A1 | 7/2003 | Schmid et al. | 502/167 |
| 2004/0182575 | A1 | 9/2004 | Reddy et al. | 166/294 |
| 2004/0182576 | A1 | 9/2004 | Reddy et al. | 166/295 |
| 2005/0000734 | A1 | 1/2005 | Getzlaf et al. | 175/73 |
| 2005/0003969 | A1 | 1/2005 | DiLullo et al. | 507/211 |
| 2005/0148475 | A1 | 7/2005 | Maresh et al. | |

FOREIGN PATENT DOCUMENTS

| | | |
|---|---|---|
| GB | 2 221 940 A * | 2/1990 |
| GB | 2 245 292 A | 1/1992 |
| GB | 2 245 294 A | 1/1992 |

OTHER PUBLICATIONS

Baroid brochure entitled "BARACOR® 95" dated 2004.
Baroid brochure entitled "BARAZAN® D Plus Viscosifier/Suspension Agent" dated 2004.
Baroid brochure entitled "Clay GRABBER® Flocculant" dated 2004.
Baroid brochure entitled "ClaySeal® Shale Stabilizer" dated 2004.
Baroid brochure entiled "Clay Sync™ Shale Stabilizer" dated 2004.
Baroid brochure entitled "Filter-Chek™ Flitration Control Agent" dated 2004.
Baroid brochure entitled "Hydro-Guard™ Water-Based Fluid" dated 2004.
Baroid brochure entitled "Hydro-Guard™ Inhibitive Water-Based Fluid" dated 2002.
Baroid brochure entitled "N-Dril™ HT Plus Filtration Control Agent" dated 2004.
Baroid brochure entitled "PAC™-L Filtration Control Agent" dated 2004.
Paper entitled "Halliburton's solution to highly reactive clay formation challenges" dated Jul. 2003.
Formal Filing Receipt for U.S. Appl. No. 10/746,589, filed Dec. 24, 2003.
Office action dated May 31, 2006 from U.S. Appl. No. 11/051,375.
Foreign communication from a related counterpart application Jun. 16, 2006.
Office Action from U.S. Appl. No. 11/051,375 dated Dec. 27, 2007.

* cited by examiner

WELLBORE TREATMENT FLUIDS HAVING IMPROVED THERMAL STABILITY

FIELD OF THE INVENTION

The present invention generally relates to aqueous wellbore treatment fluids, and more particularly to polymer-containing aqueous wellbore treatment fluids having improved thermal stability.

BACKGROUND OF THE INVENTION

The following paragraphs contain some discussion, which is illuminated by the innovations disclosed in this application, and any discussion of actual or proposed or possible approaches in this Background section does not imply that those approaches are prior art.

Natural resources such as oil or gas residing in a subterranean formation can be recovered via the formation of wells that penetrate the formation. In particular, a wellbore is typically drilled down to the formation while circulating a drilling fluid (also known as a drilling mud) through the wellbore. During the drilling process, the drill bit generates drill cuttings that consist of small pieces of shale and rock. The drilling fluid carries the drill cuttings in a return flow stream back to the well drilling platform. After terminating the circulation of the drilling fluid, a string of pipe, e.g., casing, is run in the well bore. The drilling fluid is then usually circulated downwardly through the interior of the pipe and upwardly through the annulus, which is located between the exterior of the pipe and the walls of the well bore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., cementing operations occurring after the primary cementing operation, may also be performed.

Aqueous drilling fluids are commonly employed for downhole operations. The lost circulation of such aqueous fluids is easier to control than that of oil-based drilling fluids. Further, the use of aqueous drilling fluids avoids the environmental issues associated with the clean-up and disposal of drill cuttings coated in oil. Aqueous drilling fluids usually contain clays such as bentonite or polymers such as polysaccharides or polyacrylamides to increase their viscosities. The polymer-based aqueous fluids are becoming increasingly preferred over the clay-based fluids due to the problems associated with the clay-based fluids. For instance, the downhole equipment may be clogged by clay that is present in the drilling fluid.

Unfortunately, the thermal stability of polymer-based aqueous drilling fluids is often compromised as those fluids pass down the wellbore where they are exposed to increasing temperatures. Temperatures in subterranean formations generally rise about 1° C. per hundred feet of depth. Various polymer-based aqueous fluids have their own characteristic temperatures above which they undergo severe chemical degradation, which leads to an undesirable reduction in fluid viscosity. Therefore, such fluids are typically limited to use in downhole operations above a certain depth to ensure that those fluids do not exceed a maximum temperature. Otherwise, the fluids might be unable to suspend drill cuttings therein as they flow back to the surface, and the cuttings could become deposited in undesired locations in the wellbore. Furthermore, the density of the fluids could drop to a level at which they are incapable of withstanding relatively high fluid pressures downhole.

To avoid the problems associated with viscosity reduction in polymer-based aqueous fluids, formates (i.e., organic salts) are commonly added to the fluids to enhance their thermal stability. However, this technology of using the formates is very expensive. A need therefore exists to develop a way to improve the thermal stability of polymer-based aqueous fluids without the need to use formates.

SUMMARY OF THE INVENTION

Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

According to embodiments, wellbore treatment fluids comprise: at least one polysaccharide and an effective amount of at least one polyacrylamide to maintain stability of the fluid at a temperature greater than about 250° F. The fluids are typically substantially free of formates. The temperature at which the stability is maintained may be in a range of from about 275° F. to about 325° F. The wellbore treatment fluids may further include water, an ionic salt, a basic material, a weighting agent, a surfactant, calcium carbonate, or combinations thereof. They may function as drilling fluids, completion fluids, workover fluids, or combinations thereof.

In additional embodiments, drilling fluids comprise: greater than or equal to about 14 pounds per barrel of an ionic salt; greater than or equal to about 0.2 pounds per barrel of a polysaccharide; and a sufficient amount of at least one polyacrylamide to maintain stability of the drilling fluid at a temperature greater than about 250° F. They may also comprise water and a weighting agent. The drilling fluids are typically substantially free of formates.

In still more embodiments, pre-mixed wellbore treatment fluids comprise: water; at least one polysaccharide; and an effective amount of at least one polyacrylamide to maintain stability of the fluid at a temperature greater than about 250° F., wherein the pre-mixed wellbore treatment fluid resides on a truck.

DETAILED DESCRIPTION OF THE PREFERRED EMBODIMENTS

Figure 1:
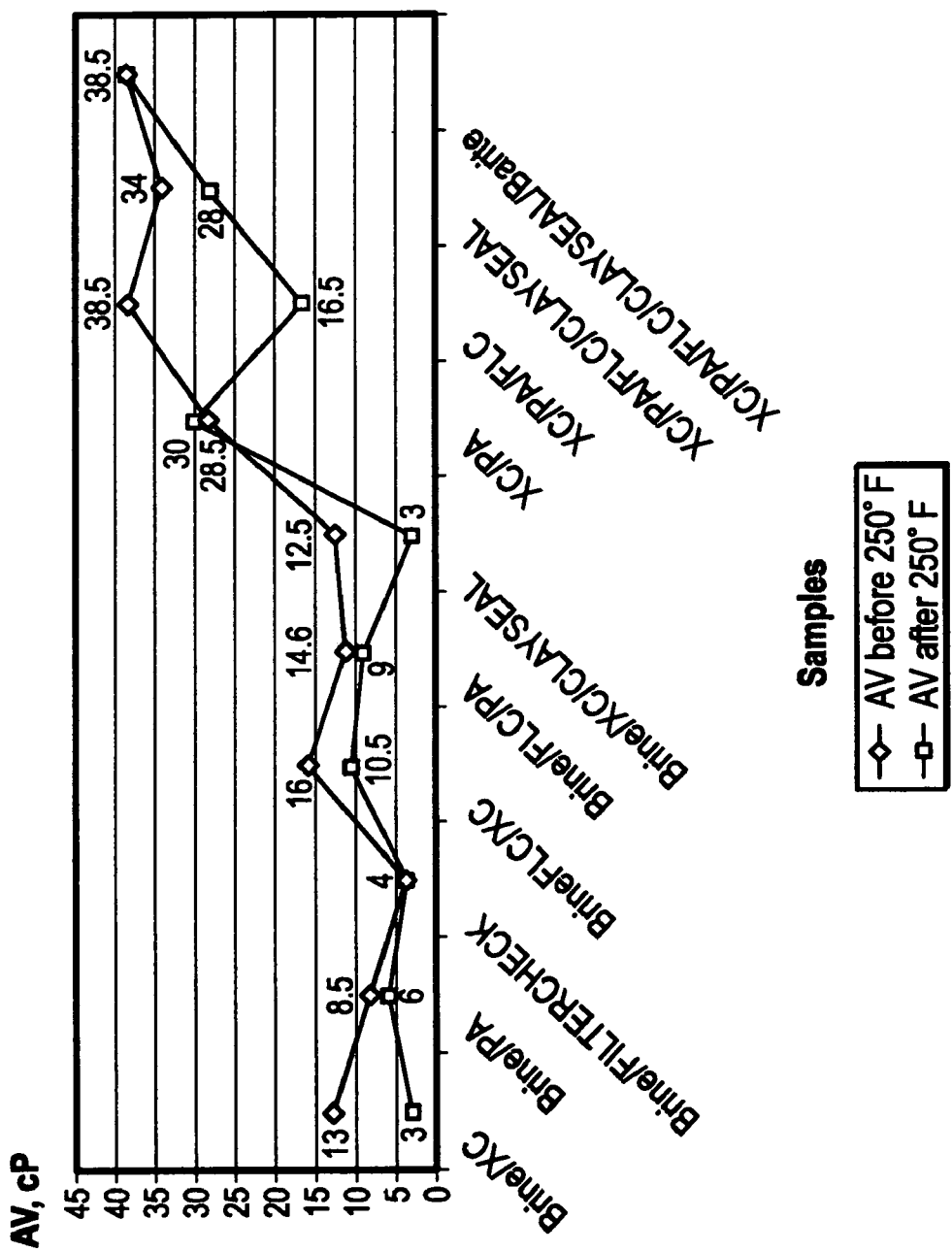
FIG. 1 is a graph illustrating the apparent viscosities of a drilling fluid containing xanthan gum and polyacrylamide in accordance with an embodiment and of control drilling fluids, the apparent viscosities being measured both before and after hot rolling the drilling fluids at 250° F.

The thermal stability of a polymer-viscosified, aqueous-based wellbore treatment fluid may be improved by incorporating sufficient amounts of at least one polysaccharide and at least one polyacrylamide to maintain stability of the fluid at a temperature greater than about 250° F. In an embodiment, the stability of the wellbore treatment fluid may be maintained at temperatures as high as in the range of from about 275° F. to about 325° F. As used herein, "stability" is defined as being capable of being exposed to such temperatures without experiencing greater than about 60% reduction in viscosity. The resulting wellbore treatment fluid may be displaced into and used in a wellbore having relatively high downhole temperatures without being concerned that the fluid might undergo degradation when exposed to those downhole temperatures. As such, the viscosity of the wellbore treatment fluid remains sufficient to suspend solids therein as it is being circulated through the wellbore.

Various polysaccharides may be included in the aqueous wellbore treatment fluid. Examples of polysaccharides include but are not limited to xanthan gum, welan gum, cellulose erivatives such as carboxyethylcellulose, carboxymethylcellulose, carboxymethylhydroxyethyl-cellulose, alkylhydroxyalkylcelluloses, alkylcelluloses, alkylcarboxyalkylcelluloses, and hydroxyalkylcelluloses, microbial polymers such as Succinoglycan polysaccharides, Scleroglucan polysaccharides, xanthan polysaccharides, and combinations thereof. In an embodiment, the polysaccharide is BARAZAN D PLUS xanthan gum, commercially available from Halliburton Energy Services, Inc. In an embodiment, the amount of polysaccharide present in the wellbore treatment fluid may be in a range of from about 0.2 to about 1.5 pound per barrel of fluid (lb/bbl), alternatively in a range of from about 0.25 to about 1.5 lb/bbl, or alternatively in a range of from about 0.5 to about 1.0 lb/bbl.

Various polyacrylamide homopolymers also may be included in the aqueous wellbore treatment fluid. Examples of such polyacrylamides include but are not limited to CLAY SYNC polymer (i.e., polyacrylamide polymer having a low molecular weight of from about 20,000 Daltons to about 40,000 Daltons) and CLAY GRABBER polymer (i.e., 40% active high molecular weighted polyacrylamide in a low viscosity emulsion), both of which are commercially available from Halliburton Energy Services, Inc. in Houston, Tex. In an embodiment, the amount of polyacrylamide present in the welibore treatment fluid may be in a range of from about 0.5 lb/bbl to about 10.0 lb/bbl, alternatively from about 4.5 lb/bbl to about 8.5 lb/bbl, alternatively from about 6.0 lb/bbl to about 8.5 lb/bbl, or alternatively from about 7.0 lb/bbl to about 8.0 lb/bbl. This concentration of the polyacrylamide polymer is higher than that used in the HYDRO-GUARD drilling fluid system commercially available from Halliburton Energy Services, Inc. The HYDRO-GUARD drilling fluid system is an aqueous, polymer-based drilling fluid system that requires the addition of formates and/or additional surfactants such as BARACOR 95 surfactant (i.e., primarily ethanol amine) to maintain its thermal stability at relatively high downhole temperatures. The need for such formates compounds the cost of the drilling fluid system, and the addition of the BARACOR 95 surfactant undesirably makes the system toxic. High-temperature stability of the aqueous wellbore treatment fluid described herein is advantageously achieved without the need to add formates or BARACOR 95 surfactant to the fluid. Thus, the increased concentration of the polyacrylamide polymer affords the fluid with the benefit of being less expensive and less toxic. Without intending to be limited by theory, it is believed that increasing the concentration of the polyacrylamide polymer ensures that it bonds with the polysaccharide such that it is less likely to bond with free oxygen or free radicals that may readily bond at higher temperatures. Accordingly, the wellbore treatment fluid remains stable when exposed to relatively high downhole temperatures.

The aqueous wellbore treatment fluid also comprises a sufficient amount of a basic material to adjust its pH to in a range of from about 8 to about 10. In an embodiment, the fluid may contain from about 0.25 lb/bbl to about 1.0 lb/bbl of sodium hydroxide (NaOH). In addition, the wellbore treatment fluid includes a balance of water after taking its other components into account. The water contained in the wellbore treatment fluid may be produced water, fresh water, or salt water, e.g., an unsaturated aqueous salt solution or a saturated aqueous salt solution such as brine or seawater. In an embodiment, the water comprises from about 14% to about 24% of an ionic salt such as sodium chloride (NaCl) by weight of the water.

The wellbore treatment fluid may contain additional additives as deemed appropriate by one skilled in the art. Examples of such additives include but are not limited to a surfactant, a weighting agent, a fluid loss control additive, and combinations thereof. An example of a suitable surfactant is CLAYSEAL shale stabilizing additive (i.e., an ethoxylated amine in methanol), commercially available from Halliburton Energy Services, Inc. In an embodiment, the amount of CLAYSEAL shale stabilizing additive present in the fluid is in a range of from about 4 lb/bbl to about 10 lb/bbl. An example of a suitable weighting agent is barite (i.e., barium sulfate). Examples of suitable fluid loss control additives include FILTER-CHEK fluid (i.e., carboxymethyl starch), N-DRIL HT PLUS fluid (i.e., a crosslinked corn starch), PAC-L fluid (i.e., polyanionic cellulose), all of which are commercially available from Halliburton Energy Services, Inc., and combinations thereof. In an embodiment, the amount of fluid loss control additive present in the fluid is in a range of from about 2 lb/bbl to about 6 lb/bbl. The wellbore treatment fluid is also desirably free of clay and thus avoids the drawbacks of using clay for viscosification.

The components in the wellbore treatment fluid may be combined using standard mixing techniques. In an embodiment, the fluid may be formed by sequentially adding and mixing the following components: water, a basic material, at least one polysaccharide such as xanthan gum, at least one polyacrylamide, and a weighting agent. It may be pre-mixed offsite and then transported on a truck to near the wellbore where it may be stored until its use is desired. Alternatively, it may be mixed on-site near the wellbore before its use.

The aqueous wellbore treatment fluid may be displaced, e.g., via pumping, into a wellbore where it can serve various purposes. It may serve as, for example, a drilling fluid, a completion fluid, or a workover fluid, each of which is well known in the art. In an embodiment, the aqueous wellbore treatment fluid may be a so-called DRIL-N fluid commercially available from Halliburton Energy Services, Inc., which is designed for drilling through producing zones (i.e., zones of a subterranean formation bearing hydrocarbons). In this embodiment, the fluid may include calcium carbonate, which exhibits a relatively high acid solubility, as a weighting agent. This fluid thus forms a filter cake that can be easily etched away with an acid without using clay as the primary viscosifier. In another embodiment, the aqueous wellbore treatment fluid may be a drilling fluid designed for general drilling of boreholes in subterranean formations, particularly through non-producing zones, wherein clay is used as a primary viscosifier. In an embodiment in which the aqueous wellbore treatment fluid is a completion fluid, it may be used during completion operations, which involve preparing the well for production. The completion fluid may be circulated in the wellbore during a completion operation to control formation pressure, thereby inhibiting fluid within the formation from prematurely flowing into the wellbore. An example of a completion operation is forming perforations through which the produced fluid can subsequently flow in the casing and the cement column. In an embodiment in which the aqueous wellbore treatment fluid is a workover fluid, it may be used during workover operations, which are used to correct mechanical problems and/or a decline in production rate that may occur after the well has been in production for some period of time. The function of the workover fluid may vary depending on the nature of the problem. The workover fluid may, for example, serve to control formation pressures, wash accumulated sand and/or other debris from the wellbore, and so forth.

EXAMPLES

The embodiments having been generally described, the following examples are given as particular embodiments and to demonstrate the practice and advantages thereof. It is understood that the examples are given by way of illustration and are not intended to limit the specification or the claims to follow in any manner.

The drilling fluid samples in the following examples were prepared and tested in accordance with American Petroleum Institute (API) procedure RP 13 B-1 sections 6.3 and 20.

Example 1

Various drilling fluid samples were prepared such that each sample contained 24% NaCl brine by weight of each sample, 1.0 lb/bbl xanthan gum, 7.5 lb/bbl CLAYSYNC polymer, and 0.50 lb/bbl CLAYGRABBER polymer in accordance with the embodiments described herein. The other samples, which served as control samples, contained solely xanthan gum and solely polyacrylamide in addition to the brine and the NaOH. The apparent viscosity (AV) of each sample was then measured in centipoise both before and after subjecting the sample to a 250° F. hot roll for 16 hours. As illustrated in FIG. 1, the samples containing both xanthan gum and polyacrylamide exhibited higher apparent viscosities both before and after the hot roll than those samples not containing both types of polymers. Also, while the apparent viscosities of the samples generally decreased after being subjected to hot rolling, the opposite effect occurred for the XC/PA sample and the XC/PA/FLC/CLAYSEAL shale stabilizing additive/barite sample, wherein "FLC" stands for fluid loss control additive. That is, the apparent viscosities of those samples remained at about the same values after the hot roll. In fact, the XC/PA sample exhibited an increase in apparent viscosity after the hot roll.

Example 2

Figure 2:
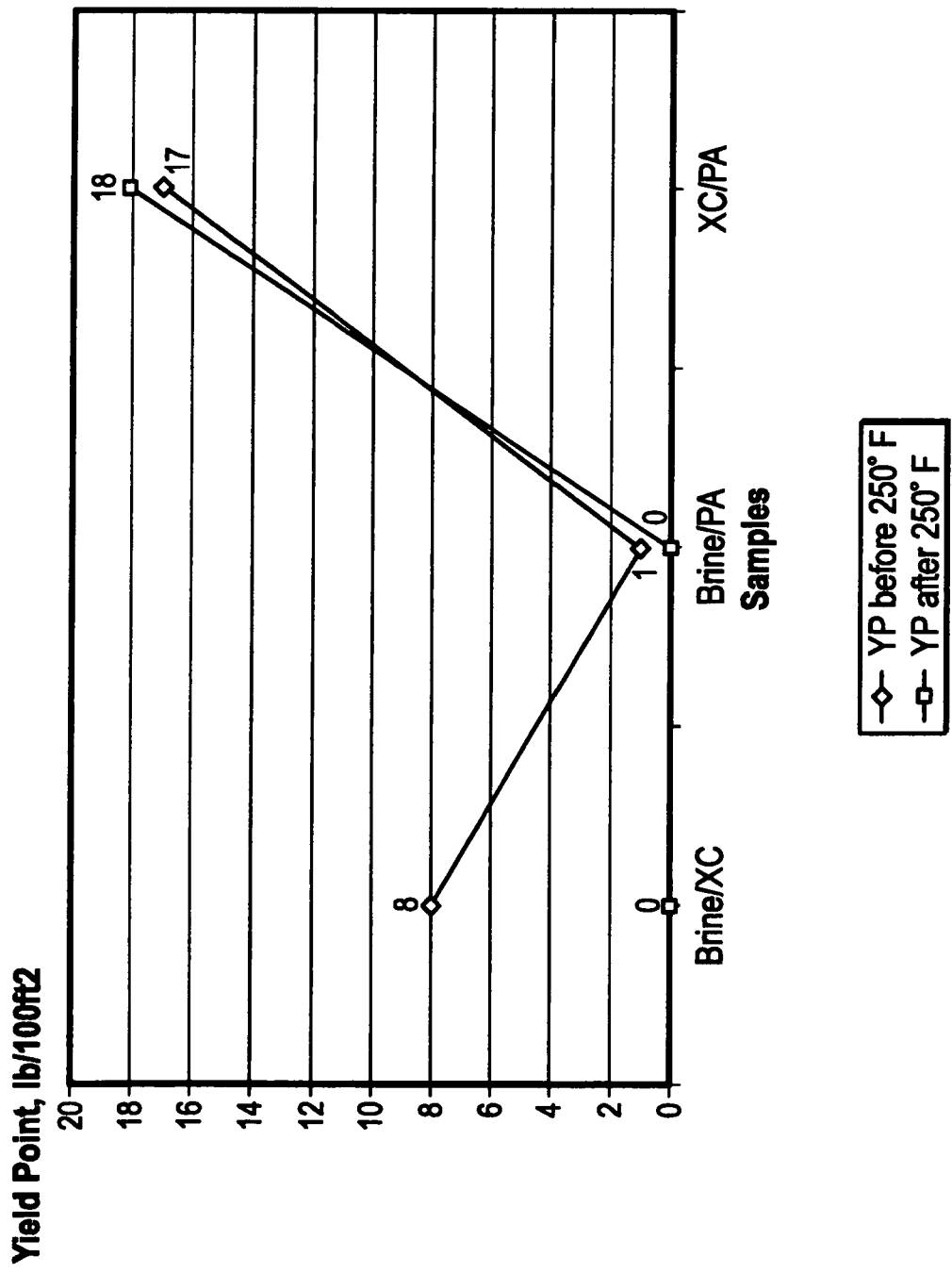
FIG. 2 is a graph illustrating the yield points of a drilling fluid containing xanthan gum and polyacrylamide in accordance with an embodiment and of control drilling fluids, the yield points being measured both before and after hot rolling the drilling fluids at 250° F.

Three drilling fluid samples were prepared such that each sample contained 24% NaCl brine by weight of each sample. One sample contained both xanthan gum (1.0 lb/bbl) and a relatively high concentration of polyacrylamide (i.e., 7.5 lb/bbl CLAYSYNC polymer and 0.50 lb/bbl CLAYGRABBER polymer) in accordance with the embodiments described herein. The other two samples, which served as control samples, contained solely xanthan gum and solely polyacrylamide in addition to the brine. The yield point (YP) of each sample was then measured both before and after subjecting the sample to a 250° F. hot roll for 16 hours. As shown in FIG. 2, the sample containing both xanthan gum and polyacrylamide exhibited much higher yield points both before and after the hot roll than those samples not containing both types of polymers. Moreover, the yield points of the control samples decreased to zero after being subjected to hot rolling, whereas the XC/PA sample exhibited an increase in yield point after the hot roll.

Based on the results of Examples 1 and 2, an aqueous drilling fluid comprising both xanthan gum and a relatively high concentration of polyacrylamide retains its stability when exposed to temperatures as high as 250° F. Thus, such fluid is expected to perform well in wellbores having downhole temperatures as high as 250° F.

Example 3

A drilling fluid sample containing a relatively high concentration of polyacrylamide (CLAY SYNC polymer and CLAYGRABBER polymer) was prepared that also included NaCl brine, NaOH, xanthan gum, CLAYSEAL shale stabilizing additive, and barite weight agent. The concentrations of the components in the sample are presented in Table 1 below in the order that they were added to the fluid. The sample was stirred for approximately 5 minutes. Then the sample was subjected to consecutive 150° F., 250° F., and 300° F. hot rolls at 16 hour intervals. The yield point, plastic viscosity, and Fann 35 viscometer dial readings of the sample were measured after each of the three consecutive hot rolls and are also presented in Table 1. The yield point of the sample surprisingly increased when it was sequentially hot rolled at 150° F. and at 250° F. It then decreased by less than 45% when it was hot rolled at 300° F. The yield point based on the 600 and 300 rpm readings as well as the 6 and 3 rpm readings remained sufficient for the drilling fluid to suspend drill cuttings under both static and agitated conditions.

TABLE 1

| | | | |
|---|---|---|---|
| Drilling fluid density, lb/gal | | 12.0 | |
| 24 wt. % NaCl, bbl | | 0.907 | |
| NaOH, lb | | 0.25 | |
| BARAZAN D PLUS xanthan gum, lb | | 1.0 | |
| CLAY SYNC polyacrylamide, lb | | 7.5 | |
| CLAYGRABBER polyacrylamide, lb | | 0.5 | |
| CLAYSEAL shale stabilizing additive, lb | | 4.0 | |
| Barite, lb | | 136.5 | |
| Rolled @ 150° F., hr. | 16 | 16 | 16 |
| Rolled @ 250° F., hr. | — | 16 | 16 |
| Rolled @ 300° F., hr. | — | — | 16 |
| Stirred, mins. | 5 | 5 | 5 |
| Temperature, ° F. | Ambient | Ambient | Ambient |
| Plastic Viscosity, cP | 32 | 33 | 26 |
| Yield Point, lb/100 ft.$^2$ | 20 | 25 | 14 |
| Fann 35 dial readings: | | | |
| 600 rpm | 85 | 91 | 66 |
| 300 rpm | 53 | 58 | 40 |

Example 4

A drilling fluid sample containing a relatively high concentration of polyacrylamide (CLAY SYNC polymer and CLAYGRABBER polymer) was prepared that also included NaCl brine, NaOH, xanthan gum (BARAZAN D PLUS polymer), carboxymethyl starch (FILTER-CHEK fluid), CLAYSEAL shale stabilizing additive, barite as a weighting agent and rev dust for simulating drill cuttings. The concentrations of the components in the sample are presented in Table 2 below in the order that they were added to the fluid. The sample was stirred for approximately 5 minutes. Then the sample was subjected to consecutive 300° F. and 325° F. hot rolls at 16 hour intervals without being pre-exposed to 150° F. Such hot rolling testing represents the worst case scenario in relation to temperature exposure to a drilling fluid. The yield point, plastic viscosity, gel strength, and Fann 35 viscometer dial readings of the sample were measured after each of the consecutive hot rolls and are also presented in Table 2. The sample surprisingly exhibited a low reduction in yield point of about 15% when it was consecutively hot rolled at 300° F. and 325° F. The rheological properties based on the Fann 35 dial readings of the drilling fluid remained sufficient for the fluid to suspend drill cuttings therein.

TABLE 2

| Drilling Fluid | 12.0 lb/gal | |
|---|---|---|
| 24 wt. % NaCl, bbl | 0.907 | |
| NaOH, lb | 0.25 | |
| BARAZAN D PLUS xanthan gum, lb | 1.0 | |
| FILTERCHEK fluid, lb | 2.0 | |
| CLAY SYNC polyacrylamide, lb | 7.5 | |
| CLAYGRABBER polyacrylamide, lb | 0.5 | |
| CLAYSEAL shale stabilizing additive, lb | 4.0 | |
| Barite, lb | 136.5 | |
| Rev dust, lb | 20.0 | |
| Rolled @ 300° F., hr. | 16 | 16 |
| Rolled @ 325° F., hr. | — | 16 |
| Stirred, mins. | 5 | 5 |
| Temperature, ° F. | 120 | 120 |
| Plastic Viscosity, cP | 36 | 21 |
| Yield Point, lb/100 ft.$^2$ | 20 | 17 |
| 10 sec. gel strength | 10 | 3 |
| 10 min. gel strength | 12 | 5 |
| Fann 35 dial readings: | | |
| 600 rpm | 80 | 59 |
| 300 rpm | 56 | 38 |
| 200 rpm | 44 | 29 |
| 100 rpm | 30 | 20 |
| 6 rpm | 10 | 4 |
| 3 rpm | 8 | 3 |

Based on the foregoing examples, an aqueous fluid comprising both xanthan gum and a relatively high concentration of polyacrylamide exhibits a yield point of greater than about 10 lb/100 ft.$^2$ when exposed to a temperature in a range of from about 250° F. to about 350° F. Accordingly, it is capable of being used in a high-temperature wellbore without being concerned that it could become unstable such that it could no longer carry drill cuttings.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A thermally stable wellbore treatment fluid comprising salt water, at least one polysaccharide in the range of from about 0.2 to about 1.5 pounds per barrel of fluid and an effective amount of at least one polyacrylamide homopolymer having a molecular weight of from about 20,000 to less than 40,000 to maintain stability of the fluid at a temperature greater than about 250° F., wherein the fluid is substantially free of clay, has a pH in the range of from about 8 to about 10, and has a yield point of greater than about 10 lb/100 ft.$^2$ when exposed to a temperature in a range of from about 300° F. to about 325° F., wherein the effective amount of the polyacrylamide homopolymer is from about 0.5 lb/bbl to about 10.0 lb/bbl, and wherein the salt water comprises from about 14% to about 24% of an ionic salt by weight of the water.

2. The wellbore treatment fluid of claim 1, wherein the temperature at which the stability is maintained is in a range of from about 275° F. to about 325° F.

3. The wellbore treatment fluid of claim 1, being substantially free of formates.

4. The wellbore treatment fluid of claim 1, wherein the polysaccharide comprises xanthan gum, welan gum, a cellulose derivative, Succinoglycan polysaccharide, Scleroglucan polysaccharide, xanthan polysaccharide, or combinations thereof.

5. The wellbore treatment fluid of claim 1, wherein the effective amount of the at least one polyacrylamide homopolymer is in a range of from about 4.5 to about 8.5 pound/barrel of the fluid.

6. The wellbore treatment fluid of claim 1, wherein an amount of the at least one polysaccharide present in the fluid is in a range of from about 0.25 to about 1.0 pound/barrel of the fluid.

7. The wellbore treatment fluid of claim 1, exhibiting a reduction in yield point of less than or equal to about 15% when it is sequentially hot rolled at a first temperature of about 300° F. and at a second temperature of about 325° F.

8. The wellbore treatment fluid of claim 1, comprising water, an ionic salt, a basic material, a weighting agent, a surfactant, calcium carbonate, or combinations thereof.

9. The wellbore treatment fluid of claim 1, comprising a drilling fluid, a completion fluid, a workover fluid, or combinations thereof.

10. The wellbore treatment fluid of claim 1, being disposed in a subterranean wellbore.

11. A drilling fluid comprising: about 14% to about 24% by weight of the fluid of an ionic salt; about 0.2 to about 1.5 pounds per barrel of a polysaccharide; and a sufficient amount of at least one polyacrylamide homopolymer having a molecular weight of about 20,000 to less than 40,000 to maintain stability of the drilling fluid at a temperature greater than about 250° F., wherein the fluid is substantially free of clay, has a pH in the range of from about 8 to about 10 at the time of mixing, and has a yield point of greater than about 10 lb/100 ft.$^2$ when exposed to a temperature in a range of from about 300° F. to about 325° F., wherein the effective amount of the polyacrylamide homopolymer is from about 0.5 to about 10.0 pounds per barrel.

12. The drilling fluid of claim 11, further comprising water.

13. The drilling fluid of claim 11, further comprising a weighting agent.

14. The drilling fluid of claim 11, further comprising a sufficient amount of a basic material to adjust its pH to in a range of from about 8 to about 10 during mixing and to maintain said pH after mixing.

15. The drilling fluid of claim 11, exhibiting a reduction in yield point of less than or equal to about 15% when it is sequentially hot rolled at a first temperature of about 300° F. and at a second temperature of about 325° F.

16. The drilling fluid of claim 11, being substantially free of formates.

17. A pre-mixed wellbore treatment fluid, comprising: water; at least one polysaccharide; and an effective amount of at least one polyacrylamide homopolymer to maintain stability of the fluid when used as a wellbore treatment fluid at a temperature greater than about 250° F., wherein the pre-mixed wellbore treatment fluid resides on a truck and was pre-mixed by sequentially adding and mixing the water, the polysaccharide, and the polyacrylamide homopolymer at a pH in the range of from about 8 to about 10.

18. The pre-mixed wellbore treatment fluid of claim 17, wherein the temperature at which the stability is maintained is in a range of from about 275° F. to about 325° F.

19. The wellbore treatment fluid of claim 1, wherein the salt water comprises sodium chloride.

* * * * *